ALF₃ (80%)-NI(20%) COMPOSITE

ARC TESTED

ALF$_3$ (80%)-NI (20%) COMPOSITE

UNTESTED

United States Patent Office 3,454,372
Patented July 8, 1969

3,454,372
COMPOSITE MATERIAL
Peter Schwarzkopf, Van Nuys, and Takuro S. Nakae, Canoga Park, Calif., assignors to North American Rockwell Corporation, a corporation of Delaware
Filed Jan. 5, 1967, Ser. No. 607,526
Int. Cl. B22f 7/00, 3/16
U.S. Cl. 29—182.1                                3 Claims

ABSTRACT OF THE DISCLOSURE

A self-cooling composite comprised of a porous continuous matrix of nickel infiltrated with aluminum fluoride as a sublimable coolant.

---

Figure 1:
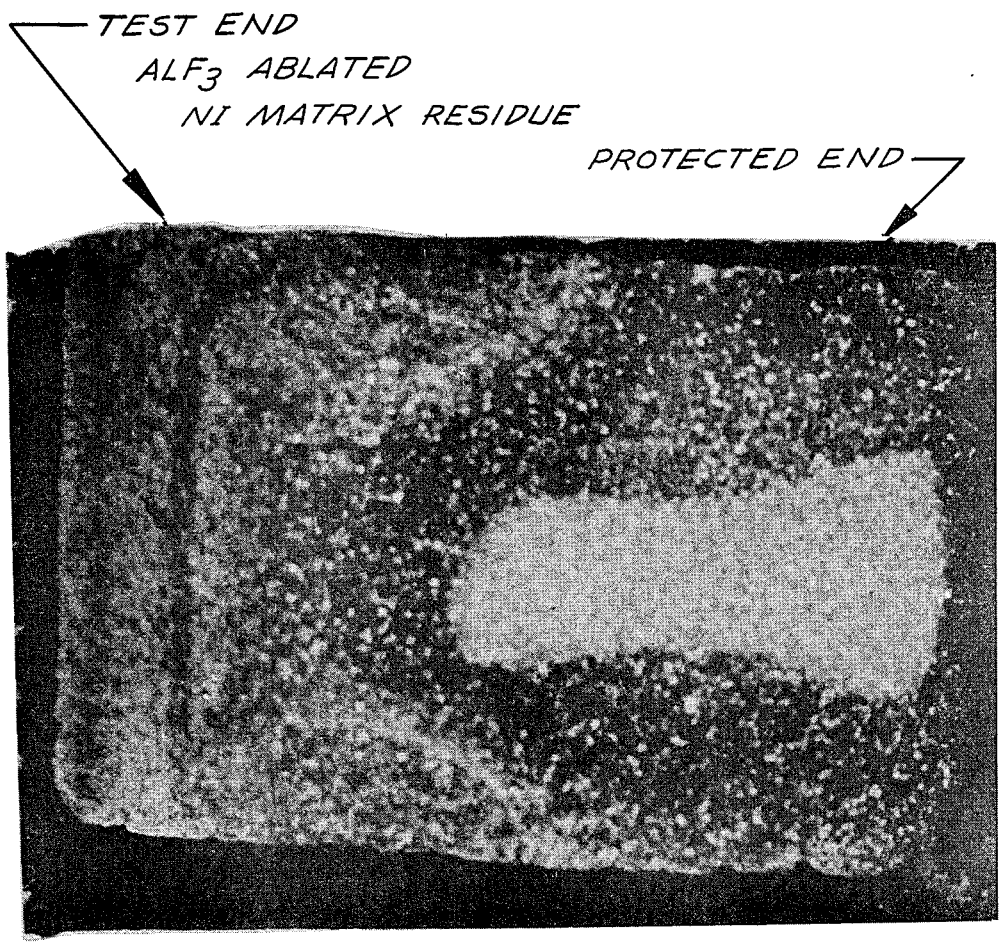

In copending application Ser. No. 607,525 filed Jan. 5, 1967, and now U.S. Patent No. 3,362,817 there is disclosed a novel method for forming porous bodies wherein the pore size and density can be carefully regulated and controlled. As explained in the copending application, the porosity is a result of powder metallurgical techniques and the reuslting pores are either interstitial or induced. Interstitial pores are the voids formed between neighboring particles in the more or less closely packed aggregate. Induced pores are created by the orderly bridging of particles caused by the addition of a powdered pore former. The void volume is subsequently produced by removable pore former by solution, evaporation or decomposition.

Control of the properties of interstitial pore structures resides primarily in the size, shape and size distribution of the metal powders. Unconsolidated poured aggregates of spheres or regular equiaxed particles contained 30–50 percent porosity distributed in irregular pore networks. The size and shape of pores are a direct function of powder size and shape. On the other hand, induced pore networks are usually the image of the size and shape of the added pore former. Induced pore diameters may be orders of magnitude larger than the metal particle diameter and porosities in excess of 90 percent are possible. Part of this porosity consists of finer interstitial voids in induced pore walls which contribute to the overall inner connection and permeability of the structure. As disclosed in the copending application Ser. No. 607,525, a general formula has been derived so one can easily determine the size of pore former and matrix powder particles utilized to form desired porosities. The method of that application is here incorporated by reference and is utilized as a basis for the herein invention.

Additionally, as was disclosed in the copending application referred to, structures of graded porosity can be formed. This is accomplished by combining in sequential fashion individual elements of homogeneous microstructure. Any complex structure can be constructed by the sequential compaction of individual volumes of specific powder composition.

The particular invention relates to the utilization of a porous matrix of nickel coprocessed with aluminum fluoride. Unique advantages are obtained from this composite structure as will be shown. Coprocessing is the means of the composite formation of this invention. The fabrication of the self cooled composite by coprocessing the matrix and coolant powders is used since the components are mutually compatible during consolidation sintering. The composite microstructures produced by the coprocessing technique can be considered analogous to induced pore structures in which the pore former is not removed from the matrix. Similar considerations exist for particle size distribution and matrix and pore former powders as in the induced structures to insure inner connection of matrix and cooling phase. As an example, inner connection may be more readily achieved if the particle size of the coolant powder is made larger relative to the matrix particle size as the volume fraction of the coolant is increased in the composite. Unlike infiltrated composites in which the total available porosity can be filled with coolant, the approach to theoretical density of coprocessed composites in the absence of extensive mass transfer during sintering is essentially dictated by initial powder size distributions. Attainment of high compacted densities requires careful blending of various predetermined size distributions and size fractions of coolant and matrix powder so that inner connected phases may be produced with a minimum of residual void volume. Separate cold pressing sintering operations are preferred for self cooled composites to avoid isolation of coolant and/or interruption of matrix structural continuity.

The particular composite of this invention can be used as a protective layer for high temperature applications. It is thus a suitable heat shield and provides both thermal and mechanical protection to the materials which it clads.

Figure 2:
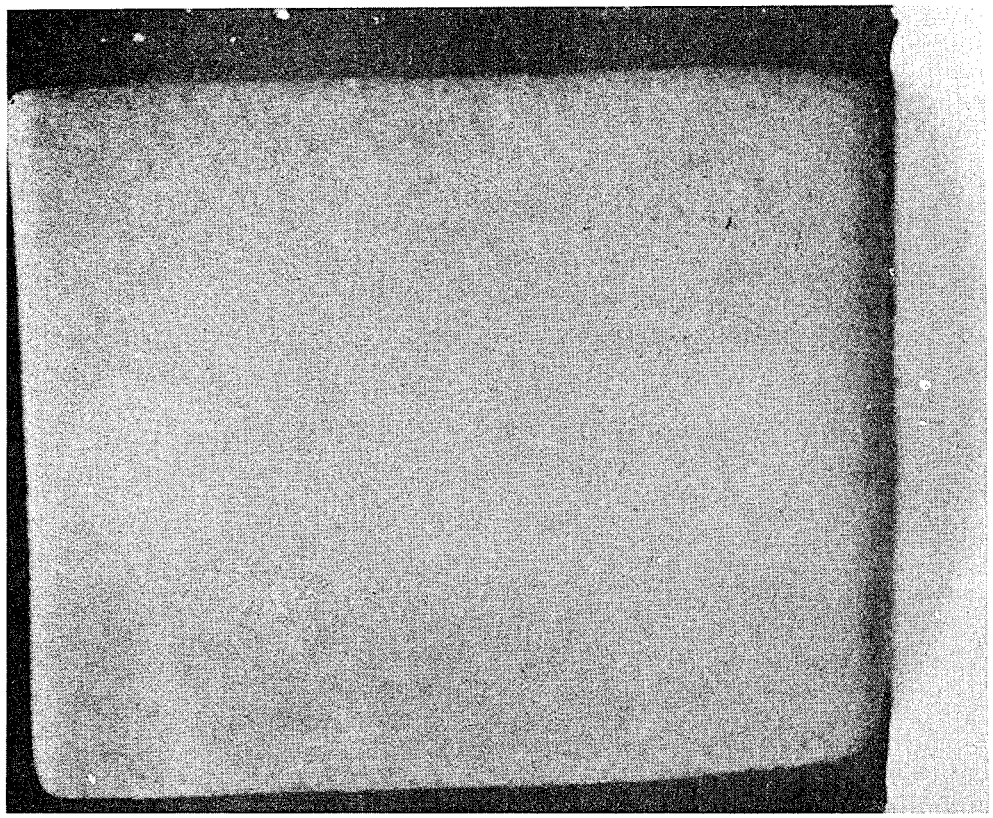

The invention will be better understood from the following detailed description and figures in which:

FIG. 1 is a photograph of the cross-section of the composite of the invention after exposure to high temperature; and FIG. 2 is a photograph of the composite of the invention before exposure to high temperature.

The aluminum fluoride, $AlF_3$, which is a subliming compound in the form of discrete particles occupies from 80 to 50 volume percent of the composite structure, while the nickel which forms the inner connected matrix network comprises from 20 to 50 volume percent. The size of the aluminum fluoride particles varies from 200 to 10 microns. Coarser particles are preferred to maintain favorable size ratios with typical commercial nickel powders. Also coarse and fine fractions are blended to achieve greater composite density. The nickel matrix size particles are from 1 to 10 microns with 3 to 5 microns being preferred.

The pressing of the composite of this inveniton is accomplished in a conventional isostatic press. The powders of the materials used are placed, as is conventional in the art, in a bag or mold made of an elastomeric material such as polyvinyl chloride and subjected to the desired pressing presures. Generally, it is preferred to press the material at from 30,000 to 50,000 p.s.i. In multi-layered structures successive layers are pressed at successively increased pressures. In such multi-layered structures the pressing pressures can range from 2,000 p.s.i. to 50,000 p.s.i. If it is desired to form a hollow shape, a mandrel can be inserted within the elastomeric bag and the powder disposed between the mandrel and the bag. This is entirely conventional within the art and a detailed description is thus not needed. After completion of the pressing, the compacted powder form is removed and placed in an oven for sintering. Generally, the sintering temperature ranges from 1625° F. to 1725° F. and can range in time from 1 to 4 hours. It has been found that normally sufficient sintering occurs at 1650° in four hours.

During exposure to extreme heat conditions, sublimation of the aluminum fluoride will occur from within the porous nickel matrix. The heat absorbed by the sublimation and transpiration of the fluoride vapor cools the nickel matrix and limits the temperature of the inner wall to the sublimation temperature of the aluminum fluoride which is about 2320° F. It is very important to note that because of this the nickel matrix is thereby preserved by the aluminum fluoride sublimation. At lower temperature conditions the nickel matrix provides a means for thermal conductivity so that the composite material can act as a cladding for heat producing reactions which may be at various times, such as in outer space, exposed to high temperatures wherein the aluminum fluoride serves as a heat absorber. In such situations it would be desirable to graduate this structure for the optimum tradeoff between thermal conductivity and the sublimation capacity. For example, the structure could be fluoride rich on the outer surface for maximum heat absorption upon reentry yet have a higher metal content on the inner surface for greater thermal conductivity in service.

It is generally preferred to utilize a pressing lubricant during the isostatic pressing of the aluminum fluoride and the nickel powders. Examples of these pressing lubricants include camphor dissolved in ether as a solvent or stearic acid in acetone, and the like, all of which are well known in the art. The purpose of the pressing lubricant in the herein invention is both to lubricate to reduce interparticle friction and promote compaction and to serve as means for the fine nickel particles to adhere to the coarse powdered aluminum fluoride prior to the pressing. Additionally, this material serves to form the interstitial porosity between adjacent particles of nickel. Very small amounts of the material is needed, generally from 1 to 5 weight percent of the total composition will suffice. During the pressing operation the soft lubricant is pressed into the interstitial voids between the nickel particles and is subsequently vaporized leaving the material when the composite is exposed to heat.

As previously indicated, the method for determining the size and amounts of powders to be utilized to form desired composite structure is determined according to the methods set forth in the correspondingly filed patent application. As set forth therein, the following formula is utilized to select the various parameters for a given desired end product:

$$\tfrac{1}{2}\frac{1-V_p}{V_p}\frac{1}{1-P_m}=N\frac{d_m}{D_p}$$

where:

$V_p$=volume fraction (induced) pore former
$P_m$=cell wall (interstitial) porosity
$N$=cell wall thickness in metal particle diameters
$d_m$=metal particle diameter
$D_p$=pore former diameter Thus, volume fractions and powder particle diameters are chosen so that $N \geq 1$.

The above formula $P_m$ is three volume percent of the interstitial pore former which, as indicated, could be camphor or stearic acid or the like.

It has been found in the present application that a composite having a porosity of at least 70 percent is feasible. In other words, at least 70 percent of the nickel matrix is occupied by the aluminum fluoride as will be shown in the following detailed examples.

EXAMPLE 1

A test specimen was prepared comprised of 240 grams of aluminum fluoride powder in the following proportions: 70 grams of a mixture of −100 mesh to +200 mesh powder, 51 grams of −200 to +400 mesh powder, and 119 grams of −400 mesh powder. 240 grams of nickel was utilized comprised of 170 grams of 100 mesh powder and 70 grams of 225 mesh powder. Added to the mixture of aluminum fluoride and nickel powder was 4.8 grams of camphor in an ether solvent. The powder and lubricant was placed in a polyvinyl chloride bag which is conventionally used in isostatic pressing operations. In the center of the bag was a cylindrical metal core such that upon completion of a compaction a cylindrically shaped body would be formed having an inner diameter corresponding to the outer diameter of the core. An isostatic pressure of 4,000 pounds per square inch was utilized. The resultant product contained about 80 volume percent AlF$_3$ and 20 volume percent Ni.

EXAMPLE 2

The specimen resulting from the sample 1 had an outside diameter of .577", a total length of .094" of which .438" was exposed to an arc plasma under conditions simulating re-entry. The frontal area was 1.82 x 10$^3$ square feet at the exposed end. The specimen was exposed to air plasma directed to one end of the cylinder. Following in Table I are the results of the test additionally giving the thermal conditions of the experiment. The figure shows the tested and untested version of the specimen. As can be seen after completion of the test the light colored central portion toward the protected end of the cylinder discloses the presence of unused aluminum fluoride. It can be seen that there was virtually no destruction to the element.

Table I.—Air plasma test conditions and results for Ni-AlF$_3$ composite

Thermal conditions:
    Surface heating rate, B.t.u./ft.$^2$-sec. _____ 166.5
    Stagnation pressure, atmospheres _____ 0.05
    Enthalpy, B.t.u./lb. _____ 2000
    Exposure time, seconds _____ 420
Heat balance:
    Total heat input, B.t.u. _____ 128
    Radiation loss, B.t.u. _____ 95.3
    Sensible heat increase, B.t.u. _____ 17.7
    Heat absorbed by AlF$_3$ vaporization, B.t.u. _ 15.0
Composite performance:
    Maximum surface temperature, °F. _____ [1] 2850
    Maximum backface temperature, °F. _____ [2] 2100
    Calculated heat of sublimation AlF$_3$, B.t.u./lb. (theoretical 1540 B.t.u./lb.) _____ 1530
    Heat of ablation/lb. AlF$_3$, B.t.u./lb. _____ 8750

[1] Melting point of Ni=2650° F.
[2] T$_{V1}$ AlF$_3$=2320° F.

EXAMPLE 3

A three layered cylindrical structure was formed. Throughout the structure, the nickel powder had a size distribution of 70 percent being 100 mesh, 30 percent being 225 mesh. The aluminum fluoride powder had a size distribution of 28.5 percent powder within the range of −100 to +200 mesh, 21.5 percent powder within the range of −200 to +400 mesh and 50 percent of the powder −400 mesh. This particular distribution of powder was found to be desirable because better packing density was achieved. When utilizing the foregoing formula the size of the majority is used for calculating the resulting porosity. The blending of various sizes of powder is a trial and error procedure, wherein density measurements of resulting structures indicate the most desirable blend.

The first cylindrical layer formed on a .725" diameter metal mandrel in a polyvinyl chloride bag was comprised of 80 weight percent nickel and 20 weight percent aluminum fluoride. Based on the nickel and AlF$_3$ composition, one weight percent camphor in an ether solvent was added to the mixture. Each formed layer utilized this one weight percent camphor. The formed specimen's outer diameter was .847" utilizing a pressing pressure of 2,000 p.s.i. The pressed product was then removed from the polyvinyl chloride bag and inserted in a second bag of larger diameter. The area between the formed cylinder and the bag was then filled with a mixture of 50 weight percent nickel pressure of 40,000 p.s.i. was utilized and a final cylinder of 1.30" diameter was formed. The three layered structure was then removed from the bag and sintered at 1650° F. for four hours. As will be noted in forming the multilayered structure the pressure to form each successive layer increased significantly. For example, it can be seen that the pressure to form the first layer was 2,000 p.s.i. while the second layer was pressed at 15,000 p.s.i. and the third at 40,000 p.s.i. The reason for this is to achieve good adherence between successive layers. By having the powder not too densely packed prior to the formation of a successive layer better bonding will occur so that no separation between layers will result.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A heat protective material comprising a porous sintered nickel matrix filled with aluminum fluoride.

2. The material of claim 1 wherein said aluminum fluoride occupies from 50 to 80 volume percent of the composite.

3. The material of claim 1 wherein said aluminum fluoride is a powder of from 10 to 200 microns in size.

References Cited

UNITED STATES PATENTS

| 3,022,190 | 2/1962 | Feldman. | |
|---|---|---|---|
| 3,089,318 | 5/1963 | Hebeler | 29—182.1 |
| 3,138,009 | 6/1964 | McCreight | 29—182.2 |
| 3,145,529 | 8/1964 | Maloof | 29—182.1 |
| 3,159,012 | 12/1964 | Brunner. | |
| 3,267,857 | 8/1966 | Lindberg | 102—105 |
| 3,285,714 | 11/1966 | Davies et al. | 29—182.1 |
| 3,338,687 | 8/1967 | Dickinson et al. | 29—182.1 |

BENJAMIN R. PADGETT, *Primary Examiner.*

R. L. GRUDZIECKI, *Assistant Examiner.*

U.S. Cl. X.R.

29—182.2, 182.5; 60—271; 102—105; 239—265.15